United States Patent [19]

Vadasz

[11] 4,293,570

[45] Oct. 6, 1981

[54] PROCESS FOR THE PREPARATION OF SWEETENER CONTAINING PRODUCT

[75] Inventor: Kalman Vadasz, South Wharton, N.J.

[73] Assignee: Chimicasa GmbH, Chur, Switzerland

[21] Appl. No.: 26,357

[22] Filed: Apr. 2, 1979

[51] Int. Cl.³ .......................... A23G 3/30; A23G 3/00
[52] U.S. Cl. ........................................ 426/3; 426/548; 426/660; 426/103; 127/16; 366/147; 366/178; 99/517; 568/868
[58] Field of Search ................... 426/548, 658, 3, 312, 426/474, 660, 524, 804, 96, 103, 285, 453; 127/15, 16, 58; 99/470, 474, 477, 478, 479, 517; 366/147, 178

[56] References Cited

U.S. PATENT DOCUMENTS

| | | | |
|---|---|---|---|
| 1,724,627 | 8/1929 | Varnau et al. | 127/16 |
| 2,594,863 | 4/1952 | Buck et al. | 127/58 |
| 2,726,959 | 12/1955 | Lushbough et al. | 426/658 X |
| 3,557,717 | 1/1971 | Chivers | 426/474 X |
| 3,973,041 | 9/1976 | Du Ross | 426/548 X |
| 4,079,151 | 3/1978 | Schade et al. | 426/548 X |

*Primary Examiner*—Joseph M. Golian
*Assistant Examiner*—Elizabeth A. Hatcher
*Attorney, Agent, or Firm*—Richard P. Crowley

[57] ABSTRACT

An apparatus and process for the preparation of cryptocrystalline sweeteners, such as sorbitol, by the spraying of a heated, aqueous, low-viscosity, high-solids, sweetener solution, employing a cool, compressed, inert gas, through a nozzle into a fine spray and into a cooler atmosphere, to form very fine particles of the sprayed sweetener product.

6 Claims, 3 Drawing Figures

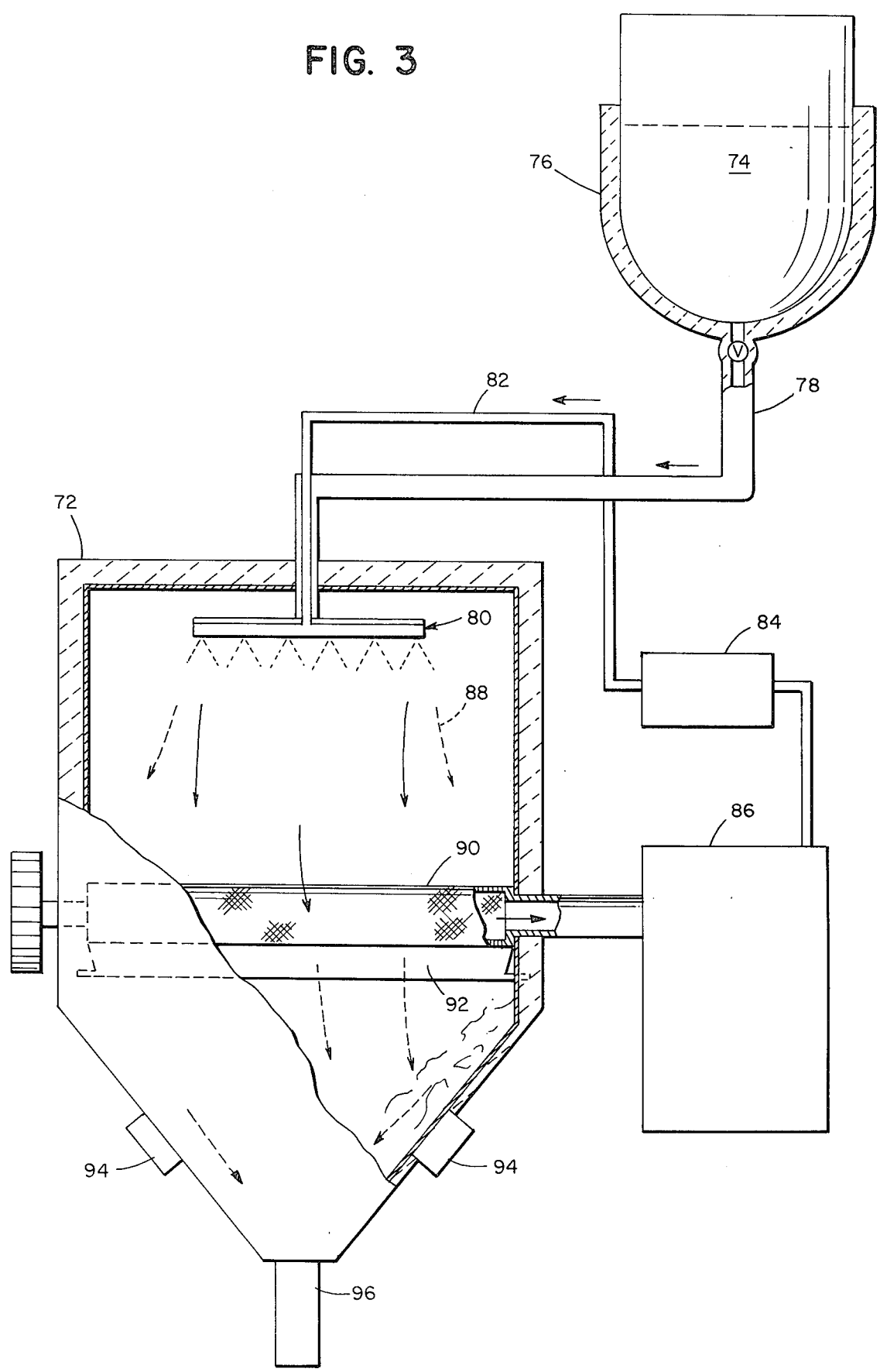

PROCESS FOR THE PREPARATION OF SWEETENER CONTAINING PRODUCT

BACKGROUND OF THE INVENTION

In the food and confectionery industries, many sweetener ingredients, such as sorbitol, sucrose, fructose, glucose, mannitol and the like and other saccharides, are employed in both powder and liquid form. Some sweeteners, particularly sorbitol, are provided in two different forms, since some products may be manufactured only by using a liquid, and some products may be manufactured only by using a powder. For example, in a sugarless, hard candy, a sweetener is used in a high-solid, liquid form, while, in sugarless or dietetic chocolate-containing products, a sweetener, such as sorbitol, has been employed in powder form. Highly concentrated, liquid-sorbitol syrups, for example, have not been able to be employed in making dietetic or sugarless chocolate products. Thus food and confectionery manufacturers must purchase and use sweeteners, such as sorbitol, in both liquid and solid form. The liquid-sorbitol form as purchased typically comprises about 70% solids, while the powdered sorbitol typically is purchased at about 98% solids or higher. Direct production of crystalline sorbitol from a molten- or liquid-sorbitol solution is difficult, because of the hydroscopic nature of the sorbitol and because of the tendency, on cooling, for the sorbitol melt to set up rapidly into a hard, glassy condition. Powdered sorbitol has a significantly higher cost per pound than a liquid-sorbitol solution.

In the manufacture of some confectionery products, such as, for example, chocolate-containing products, such as dietetic chocolate bars, moisture is not desired, and, therefore, powdered sweeteners must be employed. On employing a powdered sweetener, such as sorbitol, the finished chocolate or other product typically should not contain crystals of the sweetener which are large enough to be felt or detected by the tongue of the consumer. Thus it is desirable to have sweetener crystals with a particle size of 5 microns or less.

Common chocolate-processing equipment used industry-wide comprises a mixer which mixes together most of the ingredients and a refiner which, thereafter, refines the particle size of the crystalline sweetener to a lower size, such as to the 5-micron size or less. An emulsifier is then employed to distribute and mix the refined ingredients with the balance of the ingredients that either are not required in the refining process or where no refining requirement is needed. A conch is then used which, by its continuous moving of the mixer, removes some additional moisture or unwanted acids and improves the smoothness of the product.

Typically, the ingredients involved in the current manufacturing of chocolate comprise cocoa butter or vegetable fats, chocolate liquid, milk powder or milk fats, sugar or a sugar substitute, such as sorbitol where a dietetic chocolate product is desired, and lecithin and additional flavoring and other additive and modifying agents. In general, all of the above ingredients, with the exception of the sugar and sorbitol, can be obtained commercially in a low, micron particle size and, therefore, do not necessarily require refinement in the refiner.

The employment of crystalline or powdered commercial sorbitol is an additional high cost in the manufacture of such products and further requires the use of a refiner to reduce the crystal size of the sweetener, so that the sweetener crystals may not be detected by the consumer. For example, in the manufacture of dietetic milk-chocolate bars, powdered sorbitol is incorporated in a mixing blender, where materials are thoroughly mixed in dry form, except for the omission of some fats, such as phospholipids like lecithin and cocoa butter, a portion of which is retained for later incorporation into the product, and flavoring which may be added at a different stage of the operation. After thoroughly blending together the dry materials in the mixing blender, the blended material is then sent to a refiner for reduction of the crystal size of the sorbitol. A chocolate refiner often comprises a plurality of hydraulic-pressure rollers, for example operating at 300 to 500 pounds per square inch through which the dry, blended admixture is passed. After removal from the hydraulic-pressure rollers of the refiner, the blended material then is sent through an emulsifier where additional lipid materials, such as lecithin, are added and mixed, as well as the remaining cocoa butter and flavoring. Optionally, the material may be processed in a conch, and, thereafter, the product is cast, cooled, packaged and sold.

In the present commercial practice, which requires two forms of sweeteners, the difficulties associated with the present production processing of commercial powdered sweeteners, such as sorbitol, and the additional capital equipment and cost in the preparation of certain products make it most desirable to provide a process for the preparation of a sweetener of low particle size and a process for the use of such a sweetener for the preparation of food and confectionery products, particularly wafers, chocolate bars, chewing gum and sugarless candies. The present invention provides a process which is low in cost, simple and more direct and which avoids the use of additional equipment and additional processing steps, as currently required to be employed in the production of confectionery products.

SUMMARY OF THE INVENTION

My invention relates to the apparatus for and the process of preparing fine particle-size sweeteners, to the sweeteners so produced, to the process of manufacturing food and confectionery products, particularly confectionery products requiring low particle-size sweeteners, and to the products so produced.

More particularly, my invention concerns the direct preparation of fine particle-size sorbitol of a very fine particle size of less than about 5 microns and to the process of preparing dietetic confectionery and food products containing such sorbitol, and in particular to the preparation of dietetic chocolate and other products.

My invention concerns the preparation of a controllable, fine-particle sweetener, which process comprises the spray-cooling of a heated, aqueous, low-viscosity, high-solid, sweetener solution into a cooler atmosphere, to provide for a formation of fine particle-size, spray-cooled, sweetener particles, particularly having a particle size of less than 20 microns, and more particularly less than 5 microns. The process provides for preparing sweetener particles through the spraying in a fine spray of a heated, aqueous, low-viscosity, high-solid, sweetener solution into a cooler atmosphere under gaseous pressure, to form a fine spray of the desired particle size, and thereby to form very fine particles of the sprayed sweetener on cooling of the sprayed solution in the atmosphere. The process should not be confused with the process of spray-drying, wherein a solution is sprayed and moisture is removed to produce dried particles. Rather the present process involves spray-cooling in that substantially no moisture is removed during the spray-cooling operation, but rather the low-viscosity, high-solid, sweetener solution is converted into a cryptocrystalline state through a rapid reduction in temperature through the spray-cooling operation. The control of the fine particle size is controlled by the fineness of the spray of the solution.

Typically, the spray-cooling process involves the spraying of the higher-temperature, low-viscosity, sprayable, concentrated syrup or sweetener solution through a nozzle employing a cool gas, to produce fine particles which are converted, in the cooler atmosphere and without the loss of moisture, to the solid state. The sweetener particles produced by the process have a controllable size and may be produced in a desired size, but, for food and confectionery products, the particle size is usually less than about 5 microns, so that the refining and other required process operations, required in the past practice, may be avoided.

Sweetener crystals are characterized, when observed under a microscope, as sharp-edged structures in crystalline form. However, unlike the commercial sweetener crystals, such as powdered sorbitol, the fine, spray-cooled, sweetener particles are characterized, when observed under a microscope, to be of a rounded structural form, without any visually observable, crystalline structure present. The spray-cooled sweetener particles not being essentially crystalline are referred to as cryptocrystalline particles, to distinguish them from the prior-art, commercial, crystalline sweeteners.

The process of this invention eliminates the present difficulties associated with the production of commercial, powdered sweeteners, such as sorbitol, with some particles above 5 microns in size, and which requires the use of refiners and other mechanical means in certain food and confectionery products, to reduce the size of the crystal sweeteners employed. In addition, the process permits the conversion of the low-cost, liquid, sweetener solutions into cryptocrystalline particles, so that, in practice, only one form of the liquid sweetener may be employed in the manufacture of food products, thereby taking advantage of the great difference in cost between the crystallized sweetener product and its liquid equivalent.

Furthermore, the process permits the employment of the cryptocrystalline product, so that the use of large and expensive capital equipment, to reduce and refine the undesirable, larger, commercial, sweetener crystals present in the product, is avoided, with a consequential saving in time and operating cost.

The process of my invention and the preparation of fine cryptocrystalline sweeteners also provide for the improved and direct preparation of food and confectionery products, such as chocolate products, chewing gum and the like, by the direct spray-cooling into the food product, so that the cryptocrystalline sweetener particles so formed are directly incorporated therein, thereby eliminating the need for the use of refiners, blenders and other additional equipment or processing steps.

For example, as illustrated in the preparation of a finished chocolate product, the process permits the use of a liquid sugar or liquid sorbitol, which is in low-cost form, to be cooked or evaporated to a high-solids content; for example, above 95% by weight, and, thereafter, when all of the chocolate ingredients are properly mixed, the high-cooked sugar or sorbitol solution may be spray-cooled, through the use of heated spray nozzles, directly above or into the premixed material, to form a cryptocrystalline sweetener, thereby avoiding the use of a refiner, such as a chocolate refiner, normally used to reduce the crystalline size of the sweetener. By this process, an extremely smooth, finished, confectionery product, containing the very fine particle-size sweetener, may be produced. In this manner, there is a significant raw-material cost saving, since the low-cost, processed solution may be employed, while refiners normally used to reduce crystal size may be eliminated, as well as the additional processing costs and labor associated with the prior-art practices.

Therefore my invention also contemplates a process, particularly in the foods and confectionery industries, whereby a high-cooked, liquid, sweetener solution, having a high-solids content and a low viscosity, may be sprayed-cooled, such as by spraying through heated spray nozzles into the cool atmosphere, so as to enable the sweetener to be added to other batch materials, to obtain the advantage of the great difference in cost between the crystallized product and its liquid equivalent, as well as a process whereby the very fine cryptocrystalline form of the sweetener may be substituted, in food and confectionery products, for the crystallized, powdered, commercial sweetener presently employed of larger particle size.

In summary, the process provides for spray-cooling to obtain very fine, cryptocrystalline sweeteners, such as sorbitol, to produce particles of low and controllable size by the controlled spraying through nozzles of the heated spray solution and the temperature at which the spray is sprayed into the cool atmosphere. The process may be employed for the direct production of fine-particle, cryptocrystalline products for use in a food or confectionery product, which requires fine particles of very fine size, to eliminate equipment and steps in conventional processes, such as in chocolate making.

The process may be employed in a wide variety of aqueous sweetener solutions, particularly those solutions wherein the high-solids solutions provide for a very low, sprayable viscosity or the melt solutions provide for a glass-type formation, and where typically the solutions are provided both in liquid from at a low cost and in powdered form at a higher cost, such as, for example, as illustrated and discussed in regards to liquid and powdered sorbitol. The process may be employed in connection with both natural or artificial sweeteners, such as sucrose, sorbitol, fructose, glucose, mannitol and combinations thereof, particularly where the solution solids comprises, for example, over about 95% by weight of the sweetener, and which, at low room temperatures, is a very viscous solution, but which, at high spray temperatures, has a low viscosity; for example, 80 to 100 cps at 250° F.

The process includes heating the aqueous or cooked solution, either as received or evaporating the solution, to obtain the desired solids content, and spraying the solution typically through any spray means, such as, for example, heated spray nozzles, to the desired, fine, liquid, particle size. The control of the spray particle size and the temperature of the atmosphere into which the spray particles are sprayed define the ultimate particle size, which size may range, for example, from 1 to 20 microns; for example, as low as 1 micron or below in average particle size, with no particles being greater than about 5 microns.

The aqueous, high-viscosity, sweetener solution is typically heated from about 180° F. to 315° F., and more particularly over 290° F., such as over 300° F., in order to provide for a low-viscosity, easily sprayed solution. For the purpose of the invention, the temperature of heating and the high-solids content may vary, provided that the solution is of low viscosity, so that it may be sprayed easily through spray nozzles into a very fine particle size. Typically, the syrup solution used; for example, sorbitol, would comprise about 95% or greater in weight percentage of sorbitol, and typically up to 99.5% sorbitol, but may range, for example, for commercial sorbitol from 70% up to 99.5% sorbitol and other aqueous sweetener solutions.

The process includes spraying the aqueous, cooked, heated, low-viscosity, high-solids, sweetener solution through spray nozzles at a high temperature, and more particularly using heated spray nozzles which are insulated or have been heated with heated access lines. The fine spray is directed into a cooler atmosphere, such as a cool-air atmosphere. If desired, the air in the atmosphere may be chilled or otherwise controlled in a closed or open vessel. The spraying may be accomplished by employing a cool, dried, compressed air or other inert gas which has been cooled through employing a refrigeration means to the desired temperature. A combination may be used of employing a cooled, compressed air together with the spraying of the heated aqueous solution into a cooler or controlled air atmosphere.

In one embodiment, the aqueous, heated solution may be sprayed, through nozzles using compressed air, directly into a cooler atmosphere and the crystal particles then covered and packaged and used as desired; that is, into a hopper-type container, with the hopper-type container, if desired, being controlled in its temperature through the use of an insulating jacket or the circulation of cooler air; although typically the atmosphere may range from 10° C. up to 100° C.

In another embodiment, the heated, high-solids, sweetener solution may be sprayed within and directly above and into a food or confectionery-product mix in a mixing or conch operation, so that the cryptocrystalline particles so formed are directly incorporated into the food or confectionery product, without other mechanical means which aid in preventing agglomeration of the particles so formed. In this embodiment, for example, the spray nozzles may be mounted directly into any mixer, emulsifier, rotating pan, paddle mixer or any similar type ingredient into which other ingredients have been added or premixed, either before or after or during the spraying operation. This procedure, with the use of chocolate and other products, directly incorporates the cryptocrystalline sweetener into the product and avoids the necessity of using a refiner.

My invention will be described and illustrated in connection with certain embodiments concerned with the process of preparing a fine particle-size sorbitol and in the manufacture of confectionery products; however, it is recognized that various changes and modifications may be made in the invention and process described by those persons skilled in the art, all falling within the spirit and scope of the invention.

BRIEF DESCRIPTION OF THE DRAWINGS

FIG. 3 is a schematic illustration of an apparatus for the production of finely-divided sorbitol particles from a liquid-sorbitol solution employing an apparatus and the process of the invention.

DESCRIPTION OF THE EMBODIMENTS

Figure 1:
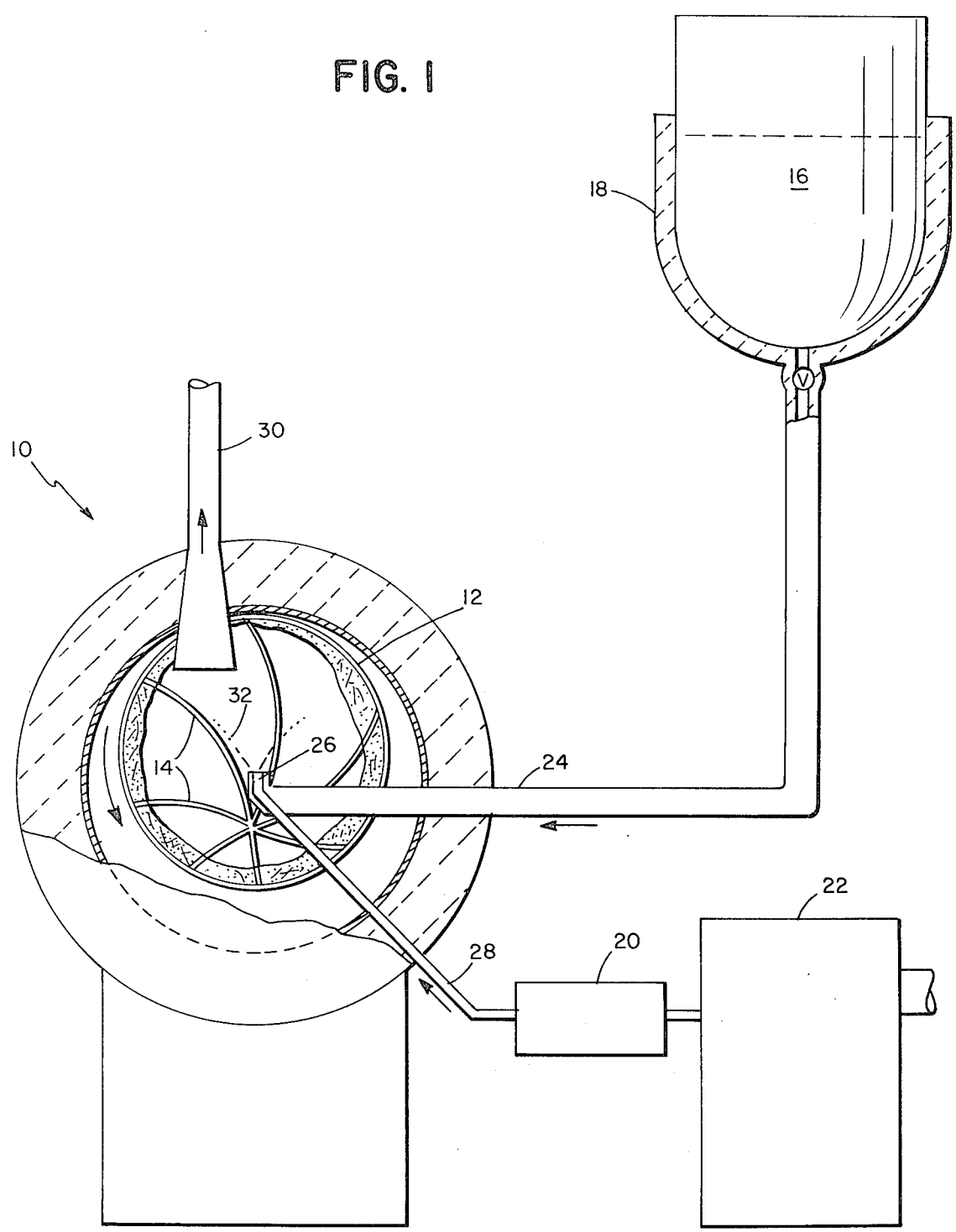
FIG. 1 is a schematic illustration of a modified, rotating-pan apparatus and system for the manufacture of sorbitol-containing chocolate employing the apparatus and process of the invention.

FIG. 1 represents a schematic illustration of the manufacture of a chocolate product, such as a chocolate bar, and more particularly a sorbitol-containing, dietary, chocolate product, wherein a liquid-sorbitol solution is spray-cooled directly into the chocolate ingredients, while the mixed ingredients are moved within a rotating-pan apparatus. In the illustrated process, the dietetic milk-chocolate bar is composed of cocoa butter, sorbitol, nonfat dry milk or powdered skimmed milk, chocolate liquer, pure vegetable shortening, soy-lecithin and vanilla as an artificial flavoring. The chocolate ingredients include: protein—10%; fat—42%; carbohydrates—44%, including about 30% sorbitol, the bar having calories of about 594 to 100 grams of ingredients.

FIG. 1 shows an apparatus 10 which includes a revolving-pan apparatus 12 containing a plurality of flights 14 on the inner surface of the pan surface, which aid in the admixture of the ingredients. The pan may be a commercial, open-type, polishing, rotating-pan apparatus modified as set forth herein. All of the ingredients, other than the sorbitol, employed in the chocolate composition in the pan interior have been refined, prior to introduction into the revolving pan. The revolving pan rotates as illustrated to maintain the refined chocolate ingredients in a mixing condition, the ingredients covering the internal surface of the revolving pan 12. The apparatus includes a vessel 16 containing cooked sorbitol syrup at a temperature, for example, of 180° F. to 315° F., or greater, if desired, with about 99.5% or less solids and typically, for example, of about 95% solids at 250° F.

The apparatus includes one or more heated spray nozzles 26, which spray nozzles are heated either through the use of the hot sorbitol solution or separately or in combination through an electrical heater or steam (not shown), in order to maintain the cooked sorbitol in solution at a high temperature until the spraying operation. Connected to the spray nozzles 26 is an inlet line 24 from the vessel 16, to introduce the heated sorbitol syrup into the spray nozzles, and an air line 28 which directs cool, dry, compressed air from a compresser 20. The air is cooled to the desired temperature and dried to remove excess moisture from the air, so that cool, dry, compressed air is passed into the heated spray nozzles 26. The revolving pan includes an air-exhaust duct 30, and the revolving pan is rotated by a drive motor, such as a controlled variable-drive motor. The cooked sorbitol vessel 16 and the sorbitol 24 and the nozzles 26 may be enclosed within suitable insulation 18, in order to maintain the sorbitol at a desired low spray viscosity and high temperature. As illustrated, on spraying of the cooked sorbitol, cryptocrystalline particles 32, typically less than 5 microns in size, of the sorbitol are formed within the revolving pan and are incorporated into the moving mixture. The heated spray nozzles are positioned generally centrally within the pan, with the spray directed into the mixture covering the surface of the pan, so that agglomeration of the particles will not form.

In operation of the apparatus of FIG. 1, the process involves a 95% solids solution, with a heated jacket and lines to deliver the cooked sorbitol to the spray nozzles 26. The sorbitol temperature may vary, but, as illustrated, may range from about 180° F. to 315° F.; for example, 250° F. to 275° F. The spray nozzles 26 temperature is maintained at 180° F. or above during the spraying operation. Cool compressed air is delivered to the spray nozzles 26 through compressed line 28 through compresser 20 and air cooler and dryer 22 typically at a pressure of from about 40 to 125 psi, again with the pressure depending upon the desired requirement and the particle size, with the compressed air at a temperature of approximately 40° F. to 120° F., to produce a liquid spray of less than 5-micron size of liquid particles. The compressed-air temperature, spray nozzles, particle size and pressure depend upon the desired cryptocrystalline size of the sorbitol required. The interior atmosphere of the revolving pan is less than 180° F., and typically is about or slightly above the temperature of the compressed air.

The revolving pan 12 has an internal surface containing flights, which surface is completely coated internally with the chocolate-containing ingredients, except for the sorbitol. The revolving pan is controlled by a variable-drive motor which determines the output of how many pounds of sorbitol can be incorporated into the ingredients at a given period of time. An air-exhaust 30 is employed which removes excess air, made up from the compressed air, from the interior of the revolving pan 12. In this process, all other ingredients of the chocolate product have been refined, as in current chocolate operations, so that the apparatus and new process replace the powdered crystalline sorbitol previously required, through directly spraying the cryptocrystalline sorbitol into the refined chocolate ingredients. If desired, if all of the other powdered ingredients in the chocolate product are purchased at a low particle size, then the ingredients need not be refined, but may be just admixed and the sorbitol could be added in the same manner as set forth. The apparatus and process, therefore, provide for the elimination of the use of powdered sorbitol or other sweeteners, such as sugar, which must be passed through the refiner and replace the powdered sorbitol with a far finer cryptocrystalline sorbitol derived from a highly concentrated, liquid, aqueous solution which is spray-cooled into the product.

Figure 2:
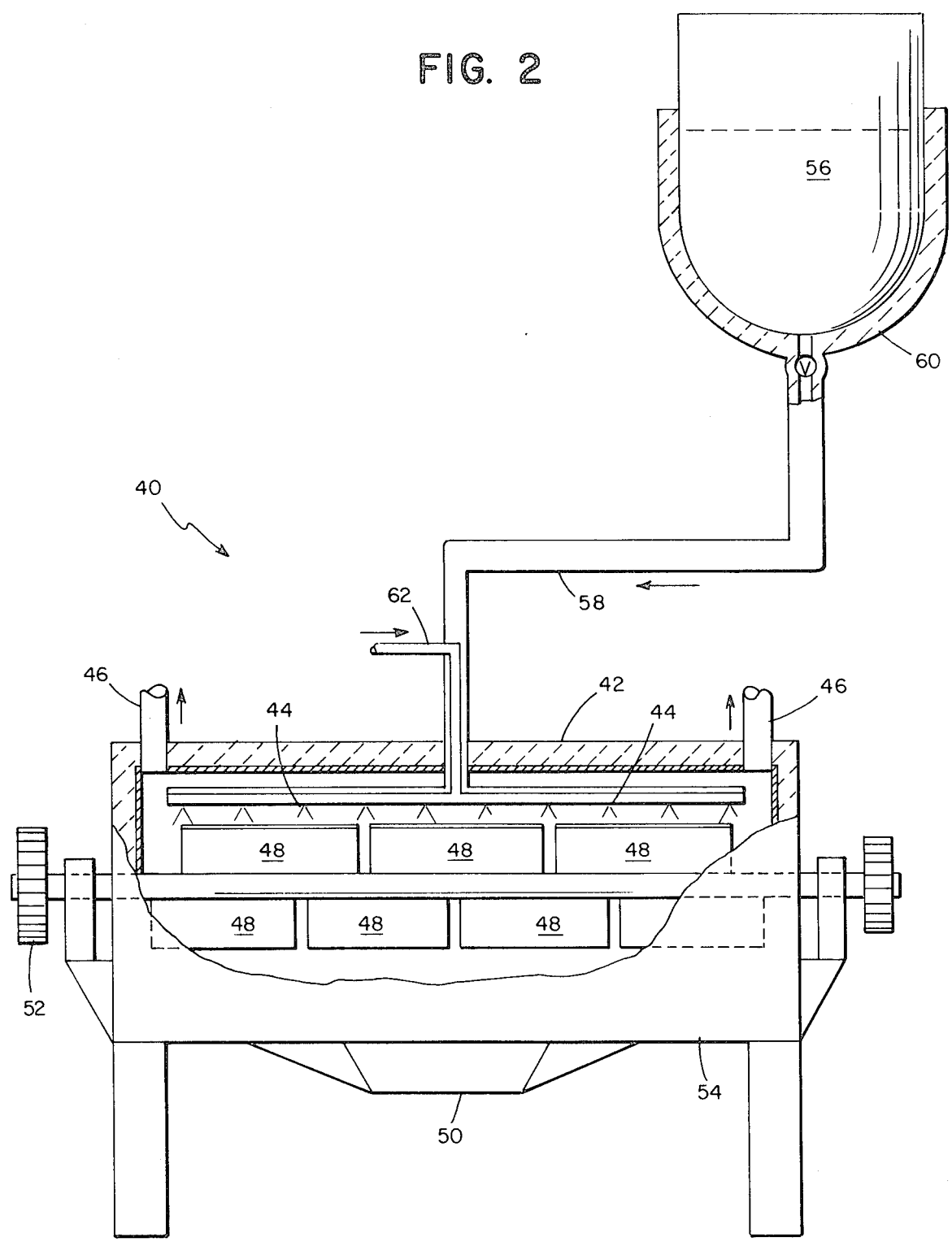
FIG. 2 is a schematic illustration of an apparatus and system for the manufacture of sorbitol-containing chocolate employing a paddle-type mixer.

FIG. 2 is an illustration of a chocolate-manufacturing process, except that, rather than incorporating a commercial powdered sorbitol into the chocolate ingredients, which would require refining of the chocolate ingredients, a liquid sorbitol is added directly to the ingredients prior to refining. The advantage of this process and apparatus is to replace previously used crystalline sorbitol with cryptocrystalline sorbitol. The apparatus and system provide for an apparatus 40 which includes a paddle-type mixer 42 and a plurality of heated spray nozzles 44 extending along the internal length of the mixer, with the mixer containing a pair of air-exhaust ducts 46 to remove exhaust air from the interior of the mixer. The mixer 42 contains a plurality of rotating mixer blades 48 to admix the ingredients. A discharge opening 50 is provided for the discharge of the material after mixing, with the mixer blades 48 secured to a rotating shaft which is driven by a motor (not shown).

Preferably the mixer 42 is jacketed to provide for the introduction of cold water or steam, so that the temperature of the ingredients during mixing may be controlled. A sorbitol-syrup-jacketed vessel 56 is employed, having insulation 60, with supply line 58 extending to the spray nozzles. There is also a line 62 for the introduction of compressed, dry, cool air into the heated spray nozzles 44.

In operation, the ingredients normally incorporated into a mixer are added into a mixer 42 and the ingredients are mixed by the blades 48. In the process, any powdered ingredients should have a particle size of less than about 5 microns, so that the step of refining may be omitted. The cooked sorbitol syrup then is introduced into container 56 through a heated jacket container 56 through the heated line 58 to the heated spray nozzles 44 and is sprayed through the compressed dry air introduced through line 62 into and throughout the length of the mixer and into the cooler atmosphere of the mixer, while the mixing blades 48 are revolving and while exhaust air is removed from exhaust-air ducts 46, to control the air temperature in the mixer. After admixing, the ingredients may be discharged from the bottom opening 50. The very fine cryptocrystalline spray particles of the sorbitol formed in the mixer are less than 5 microns and have been directly incorporated throughout the mixture after spray-cooling. By this process, the use of a refining step may be eliminated from conventional chocolate processing.

FIG. 3 shows a scheme and apparatus for the production of cryptocrystalline sorbitol particles from a liquid sorbitol solution, wherein the spray-cooling of the sorbitol provides for the production of very fine particles of sorbitol, which process may be employed for the manufacture of the improved sorbitol of this invention. For example, such improved sorbitol or other sweeteners may be used with or in tablets or in other ingredients, materials or products wherein sorbitol or the sweetener is employed.

FIG. 3 shows the process and apparatus 70 which comprises a hopper 72 and a vessel 74 containing heated, cooked sorbitol syrup of about 96% at a temperature of about 220° F. to 300° F. The sorbitol vessel 74 is jacketed with insulation 76 and includes a sorbitol supply line 78 also jacketed leading to a plurality of air-operated, fine-orifice, spray nozzles 80 arranged in the upper part of the hopper 72. A compressed air line 82 is provided to the spray nozzles 80, the line extending from an air compresser 84 and an air cooler and dryer or moisture remover 86, so as to provide for dry, cool, compressed air to the spray nozzles.

The spray nozzles are maintained in a heated condition to prevent presolidification of the sorbitol syrup. The spray-cooling of the liquid, heated, sorbitol syrup, through the spray nozzles by the cool compressed air into the cooler interior of hopper 72, provides for fine, solid particles of sorbitol, the particle size being controlled by the viscosity of the sorbitol which is related to its composition and temperature by the amount of compressed air and the nature of the nozzles and basically by the fineness of the liquid particles sprayed.

On cool-spraying, the temperature difference should be sufficient such that substantially no moisture is removed from the sprayed particles; yet the sorbitol should form fine solid particles; that is, a change in state from liquid to solid occurs. The upper portion of the hopper 72 provides the cool atmosphere through the use of the cool compressed air. Air-exhaust means may be used to control the atmosphere temperature of the upper portion of the vessel. Intermediate the hopper is provided a filter roll 90, subject to rotation through a drive and motor (not shown), which filter roll is placed in a scraping relationship with a scraper blade 92, whereby the spray-cooled particles are collected on the filter roll, removed from the scraper and are dropped into the lower section of hopper 72. The hopper is tapered to direct downwardly the fine sorbitol particles toward a discharge outlet 96, and with, optionally, vibrators 94 on each side of the hopper, to aid in the discharge of the sorbitol so formed. Optionally and preferably, the hopper 72 also is jacketed, so that the atmosphere within the hopper may be controlled by heating or cooling. The sorbitol so recovered through the discharge outlet 96 may be removed and used as an improved cryptocrystalline sorbitol product.

My invention has been described in particular in connection with the use of sorbitol; however, it is recognized, and is within the scope of contemplation of this invention, that other sweetener agents may be employed as set forth, and that the high-cooked sorbitol may be sprayed directly into products, other than the chocolate products as described. My invention has been described in connection with the preparation of a chocolate product, either with refining or with no refining at all, since the production of chocolate represents a most sophisticated operation where powdered sorbitol is used. If desired, the spray nozzles or other means to form fine particles should be so selected, so that the cooked sorbitol is maintained at a heated, low-viscosity state of generally above 180° F. until just prior to spraying, and the material is sprayed under compressed gas pressure, such as an inert gas, such as nitrogen or preferably air, to obtain instantaneous solidification through the rapid cooling through the spray-cooling of the aqueous, high-solids solution. It is desirable in most operations to precook or evaporate the moisture from the sweetener solution with considerably reduced moisture, and, therefore, a solution, for example, of over 95%, as in the case of sorbitol, is preferred for spraying.

The process of the present invention may be employed in the production of wafers, chewing gum or other multistage operations. For example, in the present process of preparing chewing gum, a two-stage operation is employed, with one stage being the base manufacturing and the second stage representing the chewing gum manufacturing. In the current process, the first stage is to make the chewing-gum base and then to break up this hard base as liquid sorbitol is employed at a high temperature. By virtue of this invention, the process of making chewing gum may be made in a simple, one-stage process, such as, for example, the manufacture into poured liquid sorbitol by spraying directly the cryptocrystalline particles into the manufactured base.

The present invention represents a substantial and significant advance in the art of the preparation and manufacture of useful cryptocrystalline sweeteners and in the manufacture of food and confectionery products employing sweeteners. The process and apparatus provide substantially lower raw materials, capital costs and operating savings and also provide for an improved product, eliminating many conventional steps previously required.

What I claim is:

1. A process of preparing a cryptocrystalline sweetener containing product, which process comprises:
   spraying in a fine liquid spray within a vessel and into the cooler atmosphere within the vessel, through heated spray nozzles, a heated, aqueous, low-viscosity, high-solids, sweetener solution selected from the group consisting of an aqueous solution of sorbitol, sucrose fructose, mannitol, glucose, and combinations thereof, having a temperature of from about 180° F. to 315° F., and containing about 70% to 99.5% by weight of sweetener, and employing in the spraying operation cool, compressed, dry, air, which cool, compressed air is introduced into the heated spray nozzles, and wherein the heated solution is maintained in a heated condition up to the point of spraying, and wherein the compressed air has a temperature of from about 40° F. to 120° F. and is employed at a pressure of from about 40 to 125 psi, and wherein the change in phase from a liquid to a solid of the sweetener solution occurs without the substantial loss of moisture during the spraying operation, to provide for the formation in the atmosphere within the vessel of a fine particle-size, cryptocrystalline, sweetener product having a particle size of less than about 5 microns, and admixing the fine-particle-size product with a food or confectionary product.

2. The process of claim 1 wherein the spraying occurs within a paddle-type mixer, which mixer contains an agitated confectionery product, and wherein the cryptocrystalline sweetener product so formed is directly incorporated into the agitated confectionery product, while being agitated by the paddle-type mixer.

3. The process of claim 1 which includes spraying the heated mixture within a vessel containing an air-exhaust means for the continuous removal of air from the container.

4. The process of claim 1 wherein the heated solution comprises from about 95% or more of the sweetener.

5. The process of claim 1 which includes spraying the heated sweetener solution directly toward an agitated mass of a confectionery product, the solid cryptocrystalline sweetener product so formed directly incorporated into the confectionery product.

6. The process of claim 1 wherein the spraying occurs within a rotating-pan apparatus, which pan contains a confectionery product on the rotating surface of the pan, and wherein the cryptocrystalline sweetener product so formed is directly incorporated into the agitated product on the surface within the rotating pan.

* * * * *